G. N. BARRIE.
KNOCKDOWN STRUCTURE.
APPLICATION FILED NOV. 7, 1912.
1,080,622.
Patented Dec. 9, 1913.
2 SHEETS—SHEET 1.
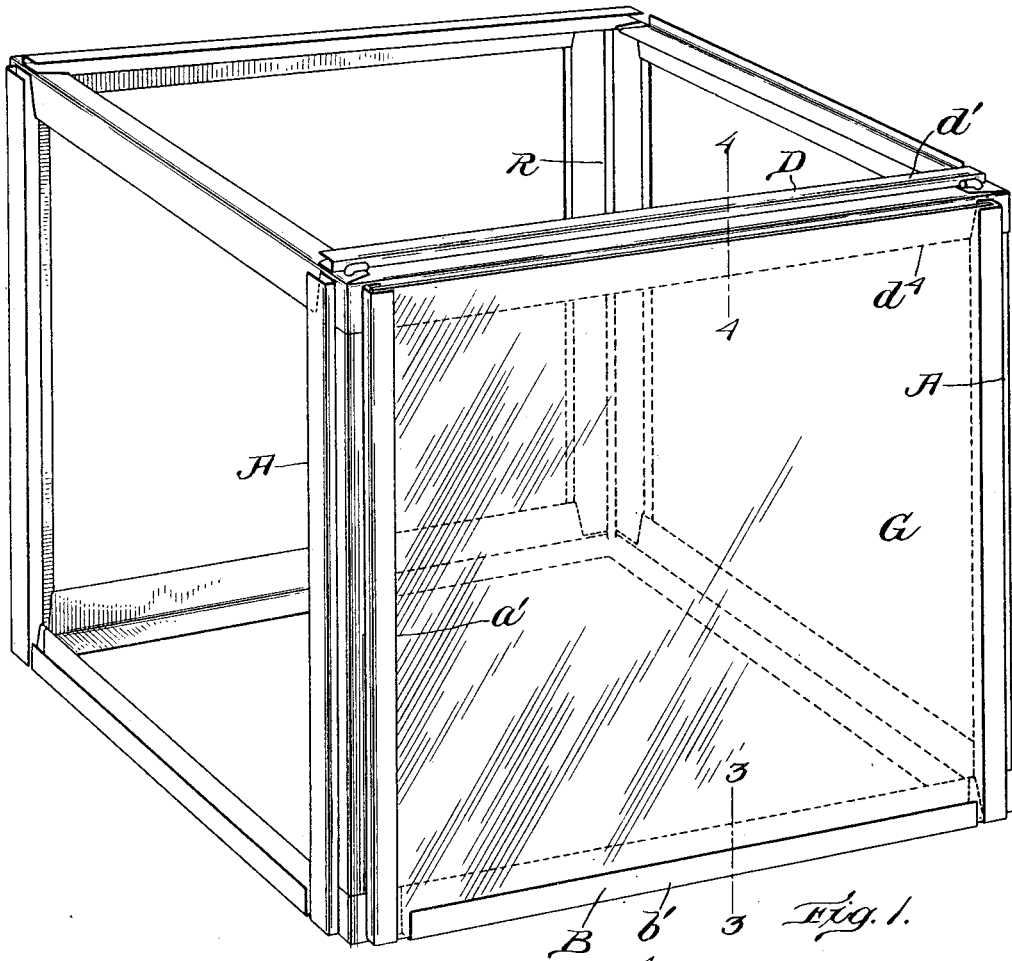
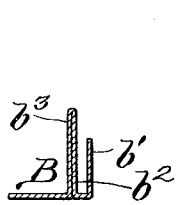
Fig. 3.
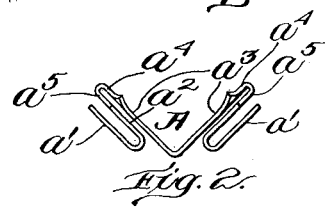
Fig. 2.
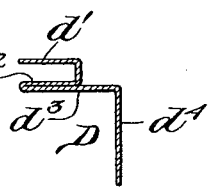
Fig. 4.
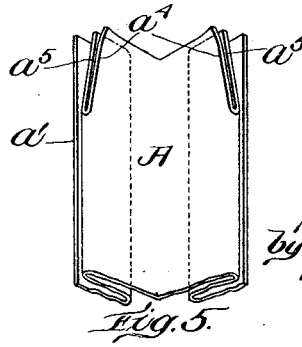
Fig. 5.
Witnesses:
Josephine H. Ryan
Charles D. Woodbury
Inventor:
George N. Barrie
by Roberts Roberts Cushman
attys.

G. N. BARRIE.
KNOCKDOWN STRUCTURE.
APPLICATION FILED NOV. 7, 1912.
1,080,622.
Patented Dec. 9, 1913.
2 SHEETS—SHEET 2.
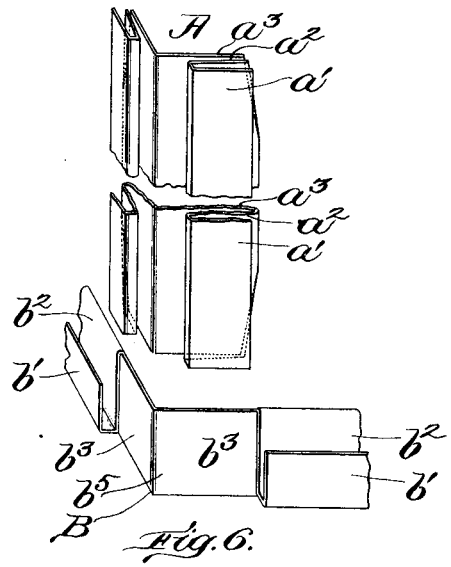
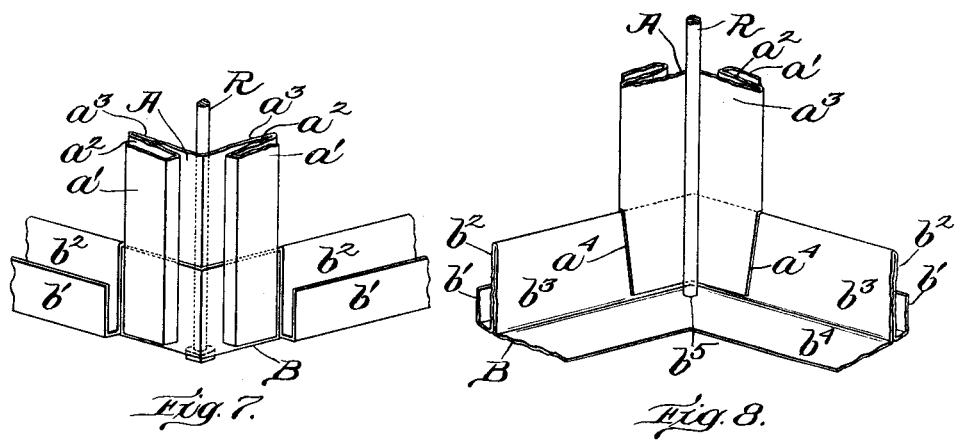
Witnesses:
Josephine R. Ryan
Charles D. Woodbury
Inventor:
George N. Barrie
by Roberts, Roberts & Cushman
Attys.

UNITED STATES PATENT OFFICE.

GEORGE N. BARRIE, OF BROOKLINE, MASSACHUSETTS.

KNOCKDOWN STRUCTURE.

1,080,622. Specification of Letters Patent. Patented Dec. 9, 1913.

Application filed November 7, 1912. Serial No. 729,989.

*To all whom it may concern:*

Be it known that I, GEORGE N. BARRIE, a subject of the King of Great Britain, and resident of Brookline, in the county of Norfolk and State of Massachusetts, have invented new and useful Improvements in Knockdown Structures, of which the following is a specification.

My invention relates to knock-down structures, and has for its particular object the provision of a knock-down frame adapted to receive and hold glass side and top pieces so as to constitute a light, portable, easily assembled and adequately strong frame for covering or forcing plants.

In the drawings hereto annexed which illustrate my invention,—Figure 1 is a view in perspective of the frame assembled; Fig. 2 is an end view of one of the corner members; Fig. 3 is a section through one side of the bottom frame taken at the line 3—3, Fig. 1; Fig. 4 is a similar section through the top frame taken at the line 4—4, Fig. 1; Fig. 5 is a view in perspective of one end of a corner member; Fig. 6 is a view in perspective showing a corner member in position to be joined with the bottom frame; Fig. 7 is a similar view showing the corner member joined to the bottom frame; and Fig. 8 is a perspective view from the inside of the structure showing the mode in which the corner frame is joined to the bottom frame.

As the mode of joinder of the corner members to the top frame of the structure is the same as to the bottom frame, a description of the latter will suffice.

Referring to Fig. 1, A, A represent corner members, B the bottom frame and D the top frame of a knock-down structure, while G represents a side piece which, for the particular purposes mentioned, should be of glass or other transparent material. The corner members A are constructed and adapted to make sliding juncture with the polygonal top and bottom frames B and D (these being square in the illustration shown) and the whole frame when assembled will for the purpose of increasing rigidity be bound together with tie rods drawing the top and bottom frames against the corner members. The corner members A are made of sheet metal bent into angle iron form, the angle between the flanges corresponding to the angles formed at the junction of adjacent sides of the top or bottom frames. In Fig. 2, which is an end view of one of the corner members, the main flanges are seen at $a^3$. The metal of which these flanges are made is bent twice upon itself to form a bend in the shape of an S comprising an outer plate $a'$ and an intermediate plate $a^2$ both substantially parallel with the main flange $a^3$. The bent edge which joins the flange $a^3$ to an intermediate plate $a^2$ is cut away so as to make an opening bounded by the sloping edges $a^4$ and $a^5$. This allows a flange of either a bottom frame or a top frame to slip between the flange $a^3$ and the intermediate plate $a^2$ in making the joint between a corner member and such top or bottom frame. In order to facilitate the entrance of such a flange of a top or bottom frame it is advisable to bend the corner of the edge $a^4$ slightly outward.

The top and bottom frames generally designated respectively as D and B are in the main alike.

Referring to Fig. 3 it is seen that the bottom frame B is composed of the lower flange $b^4$ and the upright flange $b^3$. The metal of the latter flange is bent back upon itself twice so as to form a bend in the shape of an S comprising the outer plate $b'$, the intermediate plate $b^2$ and the flange $b^3$. The members $b^2$ and $b^3$ of this S-bend may, and preferably will, lie close together.

The upper frame D comprises a vertical flange $d^4$ and the upper horizontal flange $d^3$. On the three sides of the upper frame D the metal of the top flange $d^3$ is folded twice upon itself to form an S-bend comprising the upper plate $d'$, the intermediate plate $d^2$ and the flange $d^3$.

As will be seen in Figs. 6 and 7, the plates $b'$ and $b^2$ do not extend out to the corners of the bottom flange but are cut off to leave space for the corner member A when the latter is slipped over the flanges $b^3$ of the bottom frame.

In assembling this knock-down structure, the corner members A will first be slipped into connection with one of the two polygonal frames, say the bottom frame B. Figs. 6 and 7 show the mode of making connection. The flanges $b^3$ of the bottom frame enter the spaces between the flanges $a^3$ and intermediate plates $a^2$ of the corner members. When the corner members are all set up on the bottom frame the upper ends of the corner members which are in all respects similar to their lower ends, are joined in the same way to the top frame D. Stay rods R passing through holes such as $b^5$ which are made in the polygonal frames then serve to draw the joined members firmly together. The stay rods R will be provided with threaded ends and nuts in the well known manner. With all the above described members of the frame in position as described and as indicated in Fig. 1, the channels formed between the several intermediate plates $a^2$, $b^2$ and $d^2$ and the corresponding several outer plates $a'$, $b'$ and $d'$ provide means for receiving and for holding side plates such as G (Fig. 1) which for the particular purpose herein mentioned, should be of transparent material. The provision of three such channels on the top frame D enables an upper side plate or top plate to be slipped edgewise into the upper frame, while the vertical side plates slide between the channels formed in the corner members and rest in the channels formed on the bottom frame.

The double folding of the sheet metal flanges of the several members of this frame greatly increases their strength and stiffness in addition to providing the needful means for joining the corner members to the polygonal frames and accommodating the said plates G. This construction thus enables one to use thin sheet metal so that the members for constructing a large number of such frames will weigh very little in contrast to the capacity of the frames when assembled.

What I claim and desire to secure by Letters Patent is:

1. In a knock-down structure of the character indicated, the combination with polygonal top and bottom frames, of corner members, adapted to make sliding juncture with said top and bottom frames at the angles thereof, said corner members being of angle section, with the flanges thereof formed with an S-bend to provide channels for the reception of flanges of the frames and the side plates, and stay rods at the corners extending from the top to the bottom frame, to bind the members of the structure together.

2. In a knock-down structure of the character indicated, the combination of polygonal top and bottom frames of sheet material, and corner members of angle section, having the flanges of the angle bent back upon themselves to form spaces for flanges of the frames, and again bent in the reverse direction to form channels for the reception of side plates, the material of the corner members being slitted at the ends at the first of said bends to admit the top and bottom frames, and stay rods at the corners extending from the top to the bottom frame, to bind the members of the structure together.

3. In a knock-down structure of the character indicated, the combination of polygonal top and bottom frames, of angle section, having flanges of said angles formed with S-bends, and corner members of angle section having flanges formed with S-bends to coöperate with similar bends on one of the frames for the reception of side plates said corner members slitted at the ends to admit a flange of one of the frames between portions of the corner pieces bent on each other as aforesaid, and stay rods at the corners extending from the top to the bottom frame, to bind the members of the structure together.

Signed by me at Boston, Massachusetts this 22nd day of October, 1912.

GEORGE N. BARRIE.

Witnesses:
CHARLES D. WOODBERRY,
ODIN ROBERTS.

Copies of this patent may be obtained for five cents each, by addressing the "Commissioner of Patents Washington, D. C."